(12) United States Patent
Geesey

(10) Patent No.: US 12,408,592 B2
(45) Date of Patent: Sep. 9, 2025

(54) AGRICULTURAL BALER SYSTEM WITH BALE STALL IDENTIFICATION

(71) Applicant: CNH Industrial America LLC, New Holland, PA (US)

(72) Inventor: Daniel M. Geesey, East Petersburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 749 days.

(21) Appl. No.: 17/837,542

(22) Filed: Jun. 10, 2022

(65) Prior Publication Data
US 2023/0397541 A1    Dec. 14, 2023

(51) Int. Cl.
*A01F 15/08*    (2006.01)
*A01F 15/07*    (2006.01)

(52) U.S. Cl.
CPC ...... *A01F 15/0833* (2013.01); *A01F 15/0715* (2013.01); *A01F 15/085* (2013.01); *A01F 2015/076* (2013.01)

(58) Field of Classification Search
None
See application file for complete search history.

(56) References Cited

U.S. PATENT DOCUMENTS

| | | |
|---|---|---|
| 5,622,104 A | 4/1997 | Viesselmann et al. |
| 8,677,896 B2 | 3/2014 | Vanhoutte et al. |
| 9,078,398 B2 | 7/2015 | Lang |
| 9,198,361 B2 | 12/2015 | Orlander et al. |
| 11,160,214 B2 | 11/2021 | Baker |
| 2011/0289882 A1 | 12/2011 | Whitehead |
| 2012/0240527 A1 | 9/2012 | Herron |
| 2014/0053510 A1* | 2/2014 | Smith ................. A01F 15/0715 53/461 |
| 2018/0084719 A1* | 3/2018 | Neitemeier ............... G01F 1/06 |

(Continued)

FOREIGN PATENT DOCUMENTS

| | | |
|---|---|---|
| EP | 268003 A2 | 5/1988 |
| EP | 3 266 299 B1 | 3/2019 |
| WO | 2021148946 A1 | 7/2021 |

OTHER PUBLICATIONS

Extended European Search Report for EP Application No. 23178488.5 dated Nov. 6, 2023 (10 pages).

*Primary Examiner* — Amelia Vorce
(74) *Attorney, Agent, or Firm* — Buchanan Ingersoll & Rooney PC

(57) ABSTRACT

An agricultural baler system includes a baler frame; a bale chamber; and a control system operatively coupled with the baler frame. The control system includes at least one first sensor configured for detecting at least one first operative condition associated with a baling operation and outputting at least one first operative condition signal corresponding to the at least one first operative condition. The control system further includes a controller system operatively coupled with the at least one first sensor. The control system is configured for receiving the at least one first operative condition signal and determining at least one operative parameter based at least in part on the at least one first operative condition signal. The at least one first operative parameter is associated with a bale of a crop material one of stalling and being about to stall in the bale chamber of a baler.

18 Claims, 3 Drawing Sheets

(56) References Cited

U.S. PATENT DOCUMENTS

2020/0015416 A1\* 1/2020 Barther .................. H04N 7/183
2020/0229351 A1    7/2020 Smith et al.
2022/0063617 A1\* 3/2022 Good ...................... A01F 15/08

\* cited by examiner

AGRICULTURAL BALER SYSTEM WITH BALE STALL IDENTIFICATION

FIELD OF THE INVENTION

The present invention pertains to an agricultural baler system, and, more specifically, to an agricultural control system.

BACKGROUND OF THE INVENTION

Agricultural harvesting machines, such as agricultural balers (which can be referred to balers), have been used to consolidate and package crop material (which, depending upon the application, can also be referred to as forage, forage material, or forage crop material) so as to facilitate the storage and handling of the crop material for later use. Often, a mower-conditioner cuts and conditions the crop material for swath or windrow drying in the sun. When the cut crop material is properly dried (depending upon the application), an agricultural harvesting machine, such as an agricultural baler, which can be a round baler or a square baler, travels along the swaths or windrows (hereinafter, collectively referred to as windrows, unless otherwise specified) to pick up the crop material. In the case of round balers, the crop material is formed into cylindrically-shaped round bales, and in the case of square balers, the crop material is formed into small or large square bales. More specifically, pickups of the baler gather the cut and windrowed crop material from the ground, and then convey the cut crop material into a bale-forming chamber (which can be referred to as a bale chamber) within the baler. A drive mechanism operates to activate any pickups, augers, and/or a rotor of a feed mechanism. For a round baler, for instance, a conventional baling chamber may include a pair of opposing sidewalls with a series of rolls (which can be referred to as rollers) and belts that rotate and compress the crop material into a cylindrical shape. When the bale has reached a desired size and density, a wrapping assembly, which includes wrap material, may wrap the bale to ensure, at least in part, that the bale maintains its shape and density. The wrap material can include a film (such as a flexible plastic wrap) or a net (which can be referred to as net wrap). For example, wrap material may be used to wrap the bale of crop material. A cutting or severing mechanism of the wrapping assembly may be used to cut the wrap material once the bale has been wrapped. The wrapped bale may be ejected from the baler and onto the ground by, for example, raising a tailgate of the baler. The tailgate is then closed, and the cycle repeated as necessary and desired to manage the field of cut crop material.

During baling, crop material and conditions are encountered in which the bale slows in rotation or stalls (stops rotating) within the bale chamber. This can occur when, for example, the bale chamber receives too much crop material and/or particularly heavy crop material (such as wet crop material). Driving the baler too hard or fast can cause the bale chamber to receive too much crop material. Further, occasionally, the bale chamber may suddenly receive a large quantity of crop material, such as a clump of crop material. The baler may not be able to handle these situations adequately, causing the rotation of the crop material within the bale chamber to slow or altogether stall. Further, the tendency of a bale to stall in the bale chamber may increase in conditions in which belts of the bale chamber are more prone to slip. For example, when baling in dusty or wet environments or baling with out-of-round bales (bales forming or formed in the bale chamber which are not cylindrical), power take-off (PTO) slippage and bale stalling are often observed.

What is needed in the art is a way to detect when a bale of crop material has stalled or is about to stall in the bale chamber.

SUMMARY OF THE INVENTION

The present invention provides an agricultural baler system which includes a control system which includes at least one sensor for detecting an operative condition associated with bale rotation speed, at least one sensor for detecting an operative condition associated with a reference speed, and determining whether the bale has stalled or is about to stall in light of what is sensed.

The invention in one form is directed to a control system of an agricultural baler system, the agricultural baler system including a baler frame and a bale chamber at least one of coupled with and formed by the baler frame, the control system being operatively coupled with the baler frame, the control system including: at least one first sensor configured for: detecting at least one first operative condition associated with a baling operation; outputting at least one first operative condition signal corresponding to the at least one first operative condition; a controller system operatively coupled with the at least one first sensor and configured for: receiving the at least one first operative condition signal; determining at least one operative parameter based at least in part on the at least one first operative condition signal, the at least one first operative parameter being associated with a bale of a crop material one of stalling and being about to stall in a bale chamber of a baler.

The invention in another form is directed to an agricultural baler system including: a baler frame; a bale chamber at least one of coupled with and formed by the baler frame; a control system operatively coupled with the baler frame, the control system including: at least one first sensor configured for: detecting at least one first operative condition associated with a baling operation; outputting at least one first operative condition signal corresponding to the at least one first operative condition; a controller system operatively coupled with the at least one first sensor and configured for: receiving the at least one first operative condition signal; determining at least one operative parameter based at least in part on the at least one first operative condition signal, the at least one first operative parameter being associated with a bale of a crop material one of stalling and being about to stall in a bale chamber of a baler.

The invention in yet another form is directed to a method of using an agricultural baler system, the method including the steps of: providing a baler frame, a bale chamber at least one of coupled with and formed by the baler frame, and a control system operatively coupled with the baler frame, the control system including at least one first sensor and a controller system operatively coupled with the at least one first sensor; detecting, by the at least one first sensor, at least one first operative condition associated with a baling operation; outputting, by the at least one first sensor, at least one first operative condition signal corresponding to the at least one first operative condition; receiving, by the controller system, the at least one first operative condition signal; and determining, by the controller system, at least one operative parameter based at least in part on the at least one first operative condition signal, the at least one first operative parameter being associated with a bale of a crop material one of stalling and being about to stall in a bale chamber of a baler.

An advantage of the present invention is that it provides a way for ascertaining whether a bale has stalled or is about to stall in the bale chamber, and informing an operator.

Another advantage of the present invention is that it provides a way for ascertaining whether a bale has stalled or is about to stall in the bale chamber, and automatically making at least one adjustment so as to prevent the stalling from occurring or undoing the stalling.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle, agricultural baler, and/or components thereof are usually determined with reference to the direction of forward operative travel of the agricultural vehicle and/or agricultural baler, but they should not be construed as limiting. The terms "longitudinal" and "transverse" are determined with reference to the fore-and-aft direction of the agricultural vehicle and/or agricultural baler and are equally not to be construed as limiting. The terms "downstream" and "upstream" are determined with reference to the intended direction of crop material flow during operation, with "downstream" being analogous to "rearward" and "upstream" being analogous to "forward."

Figure 1:
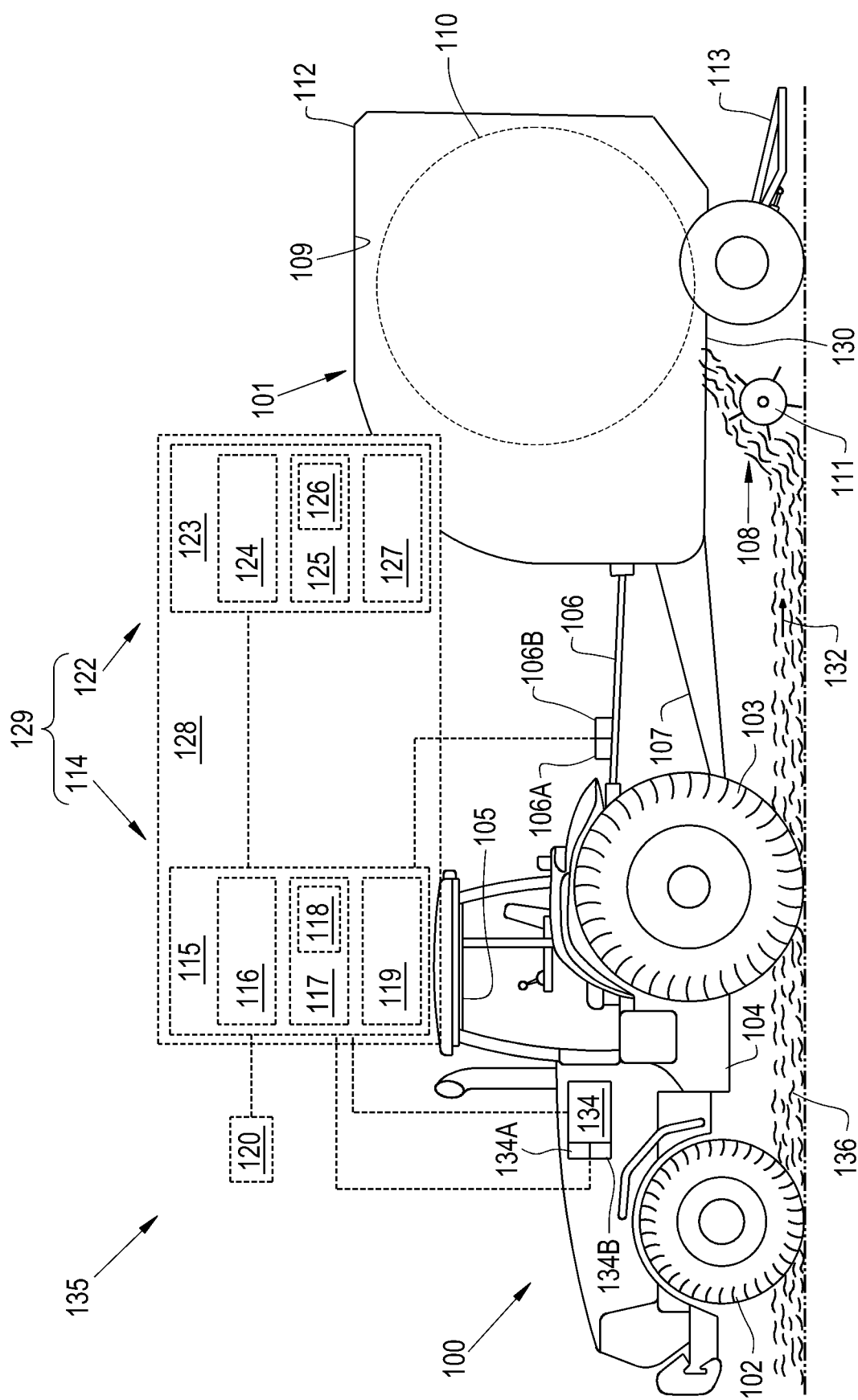
FIG. 1 illustrates schematically a side view of an exemplary embodiment of an agricultural baler system including an agricultural vehicle, formed as a tractor, and an agricultural baler, the agricultural baler system including a control system, in accordance with an exemplary embodiment of the present invention.

Referring now to the drawings, and more particularly to FIG. 1, there is shown an embodiment of an agricultural system 135 (which can be referred to as an agricultural machine system 135) including an agricultural work vehicle 100 (which can be referred to as a work vehicle, or an agricultural vehicle) and an agricultural machine 101 (which can be referred to as an agricultural implement, or an implement), which is being towed by, and thus coupled with, agricultural work vehicle 100, in accordance with the present invention, to perform an agricultural operation within a field, namely, baling. As shown, work vehicle 100 can be configured as an agricultural tractor, and agricultural machine 101 can be configured as a baler 101, such as a round baler 101, in accordance with an exemplary embodiment of the present invention, tractor 100 pulling baler 101 to perform a baling operation within the field (in this case, agricultural machine system 135 is an agricultural baler system 135). Further, agricultural machine system 135 includes a control system 129 (which can be referred to as a unified control system 129). Unified control system 129 includes control system 114 of tractor 100, control system 122 of baler 101, and, optionally, a control system (not shown) of a data center (not shown) that is cloud-based, Internet-based, and/or remotely located (this control system of the data center can be substantially similar to control systems 114, 122, having a controller, a processor, memory, data, and instructions, as described below with respect to control systems 114, 122). Control system 114 includes controller 115 (which can be a universal control module), and control system 122 includes controller 123. Further, unified system 129 can be said to include controller system 128, which includes controllers 115, 123. Control system 129, and thus also control systems 114, 122, are operatively coupled with each of frames 104, 130. Control system 114, in whole or in part, is further included as part of work vehicle 100, and control system 122, in whole or in part, is further included as part of baler 101.

Work vehicle 100 can be an operator-driven tractor or an autonomous tractor. However, in some embodiments, work vehicle 100 may correspond to any other suitable vehicle configured to tow a baler across a field or that is otherwise configured to facilitate the performance of a baling operation, including an autonomous baling vehicle. Additionally, as shown, baler 101 can configured as a round baler configured to generate round bales (alternatively, though not shown, the baler can be a square baler, configured to generate small or large square bales). It should be further appreciated that baler 101, while shown as being towed by tractor 100, may also be a self-propelled baler that does not rely on a separate vehicle for propulsion and/or power to function.

Work vehicle 100 includes a pair of front wheels 102, a pair of rear wheels 103, and a chassis 104 (which can also be referred to as a work vehicle frame 104 or tractor frame 104) coupled to and supported by the wheels 102, 103. An operator's cab 105 may be supported by a portion of the chassis 104 and may house various input devices for permitting an operator to control the operation of work vehicle 100 and/or baler 101. Additionally, work vehicle 100 may include an engine and a transmission mounted on chassis 104. The transmission may be operably coupled to the engine and may provide variably adjusted gear ratios for transferring engine power to wheels 103 via a drive axle assembly. Control system 114, in whole or in part, can be coupled with frame 104.

As shown in FIG. 1, work vehicle 100 may be coupled to baler 101 via a power take-off (PTO) 106 (which includes a PTO shaft, to which the arrow of 106 points in FIG. 1) and a tongue 107 to a hitch of work vehicle 100 to allow vehicle 100 to tow baler 101 across the field. As such, work vehicle 100 may, for example, guide baler 101 toward crop material 136 deposited in windrows on the field. As is generally understood, to collect the crop material 136, baler 101 includes a feeder system 108 (which can be referred to generally as a crop collector) mounted on a front end of baler 101. Feeder system 108 may, for example, include a pickup assembly 111, a rotor and augur arrangement (not shown), and a floor (not shown). Pickup assembly 111 includes a rotating wheel with tines that collect crop material 136 from the ground and direct crop material 136 toward a bale chamber 109 of baler 101 in an overshot manner (rotating clockwise in FIG. 1), as is known. The rotor and augur arrangement (if used) can be configured to push or otherwise to move crop material 136 towards or into bale chamber 109, in an undershot manner, as is known. FIG. 1 shows crop material 136 lying in a windrow on the ground of the field and being picked up by pickup assembly 111. Upon being picked up, crop material 136 flows over pickup assembly 111 and, if used, can flow under the rotor and augur arrangement, to bale chamber 109. Crop material 136 can move over pickup assembly 111, as indicated by arrow 132, which indicates the normal flow direction 132 of crop material 136 relative to feeder system 108. FIG. 1 shows baler 101 schematically and thus with one pair of wheels, though it can be appreciated that baler 101 can include one or more additional pair of wheels, as in FIG. 2.

Inside bale chamber 109, rollers, belts, and/or other devices compact the crop material 136 to form a generally cylindrically-shaped bale 110 for round balers (bale 110 is used for bales that are still forming and bales that are fully formed). Bale 110 is contained within baler 101 until ejection of bale 110 is instructed (e.g., by the operator and/or baler controller 123 of baler 101). In some embodiments, bale 110 may be automatically ejected from baler 101 once bale 110 is formed, by baler controller 123 detecting that bale 110 is fully formed and outputting an appropriate ejection signal. Further, work vehicle 100 includes control system 114, which includes controller 115, which includes a processor 116, memory 117, data 118, and instructions 119. Control system 114 can further include an input/output device 120 such as a laptop computer (with keyboard and display) or a touchpad (including keypad functionality and a display), device 120 being configured for a user to interface therewith.

As shown in FIG. 1, baler 101 may also include a tailgate 112 movable between a closed position (as shown in the illustrated embodiment) and an opened position via a suitable actuator assembly. Tailgate 112 and/or the actuator assembly may be controlled to open and close by baler controller 123. In the closed position, tailgate 112 may confine or retain bale 110 within baler 101. In the open position, tailgate 112 may rotate out of the way to allow bale 110 to be ejected from the bale chamber 109. Additionally, as shown in FIG. 1, baler 101 may include a ramp 113 extending from its aft end that is configured to receive and direct bale 110 away from baler 113 as it is being ejected from bale chamber 109. In some embodiments, ramp 113 may be spring loaded, such that ramp 113 is urged into a raised position, as illustrated. In such embodiments, the weight of bale 110 on ramp 113 may drive ramp 113 to a lowered position in which ramp 113 directs bale 110 to the soil surface. Once bale 110 is ejected, bale 110 may roll down ramp 113 and be deposited onto the field. As such, ramp 113 may enable bale 110 to maintain its shape and desired density by gently guiding bale 110 onto the field. Further, baler 101 includes control system 122, which includes controller 123, which includes a processor 124, memory 125, data 126, and instructions 127. Controller 123 can communicate with controllers 115, so that controller 115 outputs information to the display of input/output device 120 of work vehicle 100, thereby informing a user of various conditions of baler 101 and bales 110 forming or formed therein. Further, baler 101 includes a frame 130 (which can be referred to as baler frame 130, or more generally as a machine frame 130) to which all of the components of baler 101 are directly or indirectly coupled. Thus, feeder system 108 and thus also pickup assembly 111 are coupled with frame 130. Control system 122, in whole or in part, can be coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of baler 101 described above and shown in FIG. 1 is provided only as one example. Thus, it should be appreciated that the present disclosure may be readily adaptable to any manner of baler configuration, or other agricultural machines, such as a vehicle and/or implement, as indicated above. For example, as indicated previously, baler 101 may, in some embodiments, correspond to a square baler configured to generate square or rectangular bales. It should be further appreciated that the illustration of baler 101 in FIG. 1 is schematic.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases.

Tractor controller 115, herein, is assumed to be the primary controller for controlling operations of tractor 100, and baler controller 123, herein, is assumed to be the primary controller for controlling operations of baler 101, though it is understood that at different times each of controllers 115, 123 can control any of the other of the controllers 115, 123. Controllers 115, 123, as indicated in FIG. 1, can be in communication with the other of controllers 115, 123, thereby forming unified control system 129, such that any or all information associated with any controller 115, 123 can be shared with the other of controllers 115, 123, and any controller 115, 123 can perform the functions of the other controllers 115, 123. Controllers 115, 123 can communicate with each other in any suitable manner, such as a wired connection or a wireless connection, such as radio signals (RF), light signals, cellular, WiFi, Bluetooth, Internet, via cloud-based devices such as servers, and/or the like. Controllers 115, 123 can be configured to perform any of the functions of any of the other controllers 115, 123. Controllers 115, 123, 141 can be a part of any network facilitating such communication therebetween, such as a local area network, a metropolitan area network, a wide area network, a neural network, whether wired or wireless. Control system 129, and controller system 128, are operatively coupled with tractor 100 and baler 101, in particular with frames 104, 130. According to an embodiment of the present invention, tractor controller 115 can issue commands to baler controller 123. This is assumed to be the case herein, unless otherwise stated. According to an alternative embodiment of the present invention, baler controller 123 can issue commands to tractor controller 115 (such as for ISOBUS III or higher implements and/or vehicles). This is assumed to be the case herein, unless otherwise stated.

Control system 129 can include additional sensors or other inputs. Control system 114 can further include a GPS (not shown) mounted on tractor 100 (the tractor GPS). The tractor GPS senses the location of tractor 100 within the field, as is known, and this data can be provided to controllers 115, 123. Similarly, control system 122 can further include a GPS (not shown) mounted on baler 101 (the baler GPS). The baler GPS senses the location of baler 101 within the field, as is known, and this data can be provided to controllers 115, 123. Further, the operator, by way of device 120, can input or make certain settings. Control system 129 can further include any number additional control systems (with their individual controllers, processors, memory, data, and instructions, substantially similar to what is described above with reference to control systems 114, 122), and any such control system can have input/output devices as a part thereof and/or connected thereto.

Work vehicle 100 further includes a ground speed mechanism 134, coupled with frame 104. Ground speed mechanism 134 is well-known and thus will not be discussed in detail, but generally serves to cause work vehicle 100 to accelerate, to decelerate, or to maintain a constant speed across the ground, such as a field. For purposes herein, ground speed mechanism 134 can further include a braking system of work vehicle 100, which is well-known and thus will not be discussed in detail, but generally serves to cause the work vehicle to slow down or to stop. Ground speed mechanism 134 is operatively coupled with control system 114 by, for example, any suitable sensors and actuators known in the art for automatically controlling ground speed mechanism 134 of an automotive vehicle, wherein such sensors and actuators can be deemed to be included within both ground speed mechanism 134 and control system 114. Such sensors include one or more ground speed sensors 134A configured for sensing a ground speed of work vehicle 100 and for outputting a ground speed signal corresponding to the ground speed to controller 115. Such an actuator includes ground speed actuator 134B configured for receiving a ground speed adjustment signal from controller 115 and thereby for adjusting the ground speed of tractor 100 automatically (and thus also of baler 101, and thus also of baler frame 130). The lead line in FIG. 1 for sensor 134A and actuator 134B points to a single line, this line being understood to separate the schematic blocks above and below, one such block being sensor 134A, the other such block being actuator 134B. Sensor 134A and actuator 134B are part of control system 114 and thus also of tractor 100.

Work vehicle 100, as indicated above, includes PTO 106, which includes the PTO shaft (as shown), PTO 106 being coupled with frames 104, 130. PTO 106 is well-known and thus will not be discussed in detail, but generally serves to transmit mechanical drive power from an engine of tractor 100 to baler 101 (and thus to various components of baler 101) via the PTO shaft. PTO 106 can be operatively coupled with control system 114 by, for example, any suitable sensors and actuators known in the art for automatically controlling the torque and speed (revolutions per minute (RPM)) of the PTO shaft, wherein such sensors and actuators can be deemed to be included within both PTO 106 and control system 114. Such sensors include at least one PTO sensor 106A configured for sensing a speed of the PTO shaft and for outputting a PTO speed signal corresponding to the speed of the PTO shaft to controller 115. Such an actuator includes PTO actuator 106B configured for receiving a PTO speed adjustment signal from controller 115 and thereby for adjusting the speed of the PTO shaft automatically. Actuator 106B can be, for example, gearing associated with PTO 106 for adjusting the torque and/or speed of the PTO shaft, a transmission of tractor 100, and/or an actuator associated with an engine of tractor 100 in order to increase or reduce output power of the engine. The lead line in FIG. 1 for sensor 106A and actuator 106B points to a single line, this line being understood to separate the schematic blocks left and right, one such block being sensor 106A, the other such block being actuator 106B. Sensor 106A and actuator 106B as shown in FIG. 1 are part of control system 114 and thus also of tractor 100. Alternatively or in addition thereto, sensor 106A and/or actuator 106B can be located on a baler side of the PTO shaft, and thus communicate directly with controller 123 and thus be a part of control system 122 and baler 101 (as indicated in FIG. 2).

Figure 2:
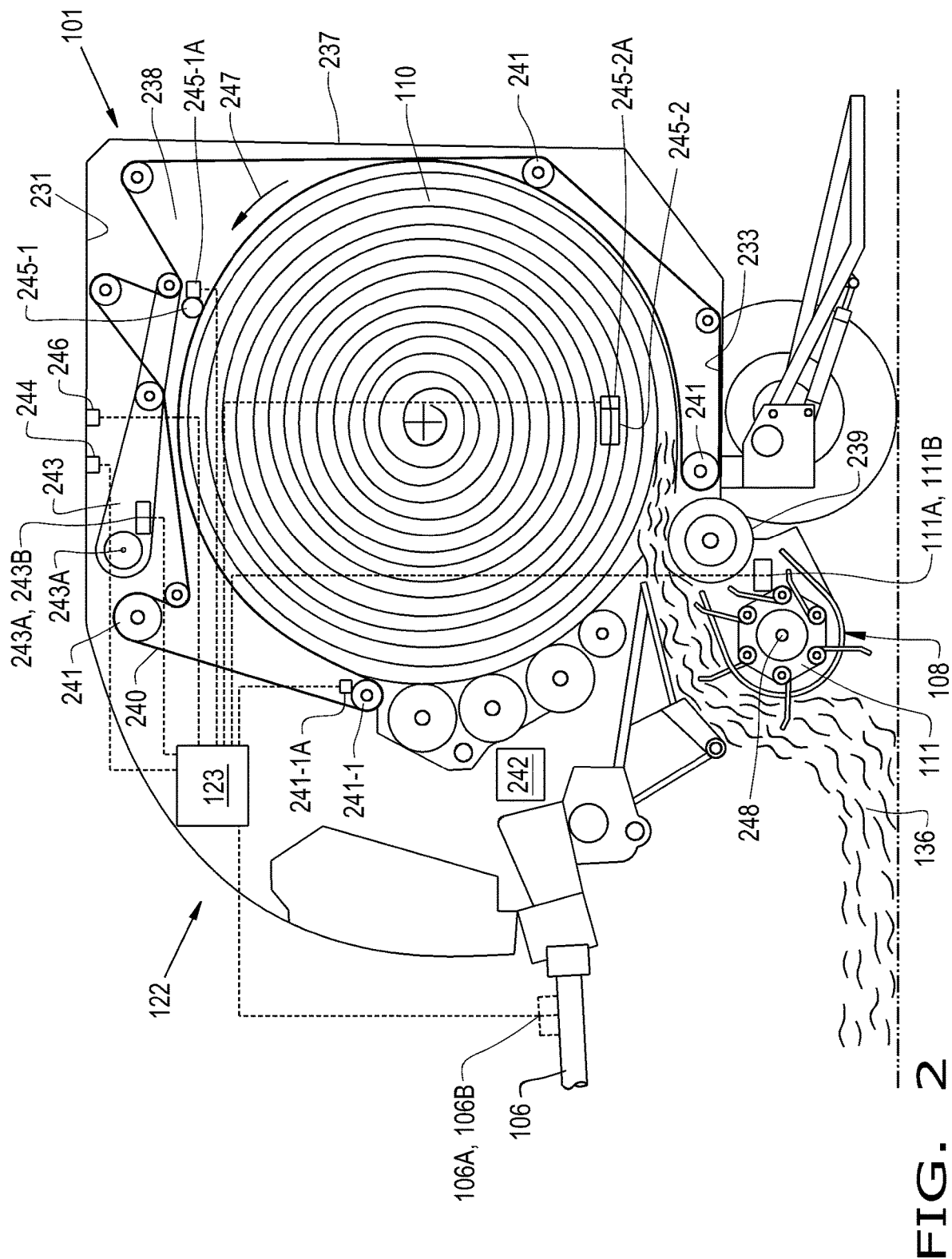
FIG. 2 illustrates schematically a side cutaway view of the internal workings of the agricultural baler of FIG. 1, in accordance with an exemplary embodiment of the present invention.

Referring now to FIG. 2, there is shown a side view of baler 101 of FIG. 1 in more detail (though still schematically), with portions broken away. Baler 101 further includes top wall 231 of baler 101, bottom wall 233 of baler 101, rear wall 237 of baler 101, side walls 238 of baler 101, rotary mechanism 239, belt 240, belt rolls (which can also be referred to as rollers) 241, wrapping assembly 242, and density arm 243 (which can be referred to as device 243). Bale 110 is essentially fully formed in FIG. 2 and rotates in direction 247 in bale chamber 109. Top wall 231, bottom wall 233, rear wall 237 (which can form part of tailgate 112), and side walls 238 are coupled with frame 130 and can be formed, for example, of sheet metal, such as steel, or any suitable material. Side walls 235 are lateral walls of baler 101. Inner surfaces of top wall 231, bottom wall 233, rear wall 237, and side walls 238 can form, at least in part, bale chamber 109, which is coupled with and/or formed by baler frame 130. Rotary mechanism 239 is configured to move crop material 136 onward into bale chamber 109 and can rotate clockwise (according to the view of FIG. 2) about a transversely extending axis of rotation. Belt 240 can be endless and winds in serpentine manner around a series of belt rolls 241. Belt 240 serves to compress crop material 136 in bale chamber 109 and thereby to form at least a partial circumferential boundary for bale 110 forming in bale chamber 109 (shown extending from about the 9 o'clock to the 6 o'clock positions in FIG. 2). Belt rolls 241 (only a few of which are labeled in FIG. 2) serve to tension belt 240. Roll 241-1 can be deemed to be a drive roll which receives mechanical power from PTO 106 and transmits that mechanical power to belt 240. Additional rolls (unlabeled) are shown from about the 7 o'clock position of bale 110 to about the 9 o'clock position, these rolls also forming a partial circumferential boundary for bale 110 (and thus compressing bale 110 at least in a latter forming stage of bale 110), each rotating in a clockwise direction about a respective transversely extending axis of rotation. Wrapping assembly 242 (shown schematically and which is known) is coupled with frame 130 and is configured for wrapping a wrap material (not shown) about crop material 136 in bale chamber 109 during a wrap cycle. Density arm 243 is configured to pivot about axis 243-1 and thus toward or away from belt 240 in order to apply more or less pressure to belt 240, and thereby to compress bale 110 more or less, and thereby to provide for a more or less dense bale 110, as is known.

Control system 122 (and thus also baler 101) includes one or more of the following: belt speed sensor 244, wheel speed sensor 245-1A, wheel speed sensor 245-2A, bale surface speed sensor 246, drive roll speed sensor 241-1A, pickup speed sensor 111A, pickup speed actuator 111B, density arm position sensor 243A, and density arm position actuator 243B. Each sensor 244, 245-1A, 245-2A, 246, 106A, 241-1A, 134A, 111A, 243A (to the extent it is included within a respective embodiment of the present invention) is positioned in any suitable location, is coupled with frame 104, 130, and is configured for detecting an operative condition associated with a baling operation and for outputting, to controller 115, 123, an operative condition signal corresponding to the operative condition. Controller system 128 is configured for: receiving the operative condition signal; determining at least one operative parameter based at least in part on the operative condition signal(s), the at least one operative parameter being associated with bale 110 of crop material 136 stalling or being about to stall (slowing) in bale chamber 109 of baler 101. Further, each actuator 134B, 111B, 106B, 243B (to the extent it is included within a respective embodiment of the present invention) is positioned in any suitable location, is coupled with frame 104, 130, and is configured to receive a respective adjustment signal from controller 115, 123 and thereby to adjust structure respectively associated therewith.

Belt speed sensor 244 can be attached to top wall 231 and positioned within bale chamber 109 so as to be directed at belt 240. Because belt 240 can be split so as to include at least two circumferential straps (it being assumed herein that belt 240 has two such straps), sensor 244 can be placed off center from a longitudinal midline of baler so as to be directly above a strap of belt 240. Sensor 244 is configured for detecting a speed of belt 240 and for sending a belt speed signal to controller 115, 123 corresponding to the belt speed. The speed of belt 240 is associated with a rotational speed of bale 110 in bale chamber 109. Optionally, belt speed sensor can be a camera, a lidar sensor, or a radar sensor (or, more generally, a video, optical, or radar sensor).

Wheel speed sensor 245-1A is configured for detecting a wheel speed of a circumferential wheel 245-1 (that is, wheel mechanism 245-1) of baler 101. Wheel 245-1 can be a star-shaped device that includes a plurality of tines that contact crop material 136 on a circumferential surface of bale 110 in bale chamber 109. Circumferential wheel 245-1 can contact bale 110 between straps of belt 240 and thus be positioned between such straps of belt 240. As bale 110 rotates, wheel 245-1 is caused to rotate by bale 110. Wheel speed sensor 245-1A detects the rotational speed of circumferential wheel 245-1 (which is associated with a rotational speed of bale 110 in bale chamber 109) and outputs to controller 115, 123 a circumferential wheel speed signal corresponding to this rotational speed. Wheel 245-1 can be attached to any suitable support coupled with frame 130, which can move so that wheel 245-1 maintains contact with bale 110 as bale 110 grows from its smallest size to its largest size within bale chamber 109. Sensor 245-1 can be attached in any suitable way within bale chamber 109, such as to this support.

Wheel speed sensor 245-2A is configured for detecting a wheel speed of a side wheel 245-2 (that is, wheel mechanism 245-2) of baler 101. Wheel 245-2 can be a star-shaped device that includes a plurality of tines that contact crop material 136 on a lateral end surface of bale 110 in bale chamber 109. As bale 110 rotates, wheel 245-2 is caused to rotate by bale 110. Wheel speed sensor 245-2A detects the rotational speed of side wheel 245-2 (which is associated with a rotational speed of bale 110 in bale chamber 109) and outputs to controller 115, 123 a wheel speed signal corresponding to this rotational speed. Wheel 245-2 can be attached to any suitable support coupled with frame 130, which can move so that wheel 245-2 maintains contact with bale 110 as bale 110 grows from its smallest size to its largest size within bale chamber 109. Sensor 245-2 can be attached in any suitable way within bale chamber 109, such as to this support.

Bale surface speed sensor 246 can be attached to top wall 231 and positioned within bale chamber 109 so as to be directed at a circumferential surface of bale 110 between straps of belt 240. Alternatively, sensor 246 can be placed toward the front of baler, on a respective side wall 238, rear wall 237, or bottom wall 233 and thus be directed at a circumferential or a lateral end surface of bale 110. Sensor 246 is configured for detecting a rotational speed of a surface (i.e., the circumferential surface, or a lateral surface) of bale 110 and for sending a bale surface speed signal to controller 115, 123 corresponding to the bale surface speed. Optionally, bale surface speed sensor can be a camera, a lidar sensor, or a radar sensor (or, more generally, a video, optical, or radar sensor).

Drive roll speed sensor 241-1A can be coupled with, for example, a support which supports drive roll 241-1. Drive roll speed sensor 241-1A is configured for detecting a rotational speed of drive roll 241-1A and for sending a drive roll speed signal to controller 115, 123 corresponding to the rotational speed of drive roll 241-1. Alternatively or in addition thereto, a sensor can be configured for detecting a rotational speed of any of the other rolls within bale chamber and for sending a roll speed signal to controller 115, 123 corresponding to the rotational speed of the roll.

Pickup speed sensor 111A can be a part of pickup assembly 111. Sensor 111A can be coupled with any suitable support. Sensor 111A is configured for detecting a rotational speed of a shaft or reel (hereinafter, the pickup shaft 248) of pickup assembly 111 which rotates the tines of pickup assembly 111, and for sending a pickup shaft rotational speed signal to controller 115, 123 corresponding to the rotational speed of the pickup shaft 248.

Density arm position sensor 243A can be a part of density arm 243 and can be coupled with any suitable structure. Sensor 243A is configured for detecting an angular position of density arm 243 about axis 243-1 and for outputting to controller 115, 123 a density arm position signal corresponding to the angular position of density arm 243.

Controller 115, 123 is configured for receiving the respective signals from sensors 244, 245-1A, 245-2A, 246, 106A, 241-1A, 134A, 111A, 243A. Upon so receiving, controller 115, 123 is configured for determining the operative parameter based at last in part on one or more of these signals. More specifically, controller 115, 123, can receive a signal from at least one of sensors 244, 245-1A, 245-2A, and 246, signifying the rotational speed of bale 110. Further, controller 115, 123 can receive a signal from at least one of sensors 106A and 241-1A, as a reference speed. Controller 115, 123 can then calculate a difference between, for instance, the rotational speed of belt 240 from sensor 244 and a rotational speed of the PTO shaft (a reference point) from sensor 106A, and then compare this difference with a predetermined threshold value. If the difference exceeds the predetermined threshold value, then controller 115, 123 can conclude that bale 109 has stalled within bale chamber 109 (that is, bale 110 has stopped rotating) or is about to stall (bale 110 has slowed substantially), which thus assumes that belt 240 and bale 110 are moving or not moving together. The conclusion of stalled or about to stall is deemed herein to be, collectively, a stall condition (which is an operative parameter). Alternatively or in addition thereto, such calculations of differences can occur relative to any of the sensors 244, 245-1A, 245-2A, 246 (each of which are associated with bale rotational speed) and sensors 106A, 241-1A (each of which are associated with a reference point speed). That is, any combination of sensors from the first group including sensors 244, 245-1A, 245-2A, 246 and the second group including sensors 106A, 241-1A can be used to make the calculation (at least one from each group being used to calculate the difference). If more than one difference is calculated using a different combination of sensors from these two groups of sensors, then these difference values can be averaged, for instance, to obtain a possibly more accurate reflection of whether a stall condition has occurred. Further, the nature of the stall condition can be further ascertained using these sensors, and a corresponding type of corrective action can be taken by operator and/or controller 115, 123. For instance, sensors 245-1A, 245-2A, and/or 246 may suggest bale 110 is rotating while sensor 244 suggests that belt 240 has stopped rotating (or vice versa), then a certain type of corrective action can be taken. By way of another example, if each of sensors 244, 245-1A, 245-2A, 246, and 241-1A suggest that bale 110, belt 240, and drive roll 241-1 are not rotating while PTO sensor 106A indicates the PTO shaft is rotating, then another type of corrective action can be taken. By way of yet another example, if each of sensors 244, 245-1A, 245-2A, 246, and 241-1A suggest that bale 110 and belt 240 are rotating while drive roll 241-1 is not rotating, then another type of corrective action can be taken. By way of yet another example, if sensor 241-1A indicates drive roll 241-1 is rotating but sensors 244 and sensor 245-1A (or sensor 245-2A) indicate that belt 240 and bale 110 are not rotating, then drive roller 241-1 is likely slipping relative to belt 240, which may require a different type of corrective action (such as increasing the friction by way of density arm 243); however, the present invention would not be focused on only the scenario of drive roll 241-1 rotating and belt 240 not rotating. Thus, controller 115, 123 can recognize when the difference (between a value indicate of bale rotation speed (the first group of sensors) and a reference speed (the second group of sensors) is increasing, suggesting that bale rotation speed is dropping (slowing), indicating that stalling is about to occur, or that bale rotation has stopped (stalled). These examples are not intended to be exhaustive.

When controller 115, 123 finds a stall condition, controller 115, 123 can output such information (i.e., the various speeds from sensors 244 and 106A, the difference calculated, and/or a stall condition has occurred (optionally specifying that bale 110 has actually stopped rotating, or is slowing and about to stop) to display 120, thereby informing the operator, who can then take corrective action to prevent the stall from happening or to undo the stall, such as (for example) decreasing ground speed, decreasing pickup shaft 248 speed, decreasing PTO shaft speed, and/or changing the angular position of density arm 243, and/or changing these and/or other settings. Alternatively, or in addition thereto, controller 115, 123 can automatically take corrective action. The corrective action can be directed, for instance, to reducing the quantity of crop material 136 that bale chamber 109 is receiving. Thus, controller 115, 123 can output an adjustment signal to one or more of actuators 134B, 111B, 106B, 243B. For instance, controller 115, 123 can output an adjustment signal to ground speed actuator 134B to reduce the speed of tractor 100 and thus also of baler 101. Alternatively or in addition thereto, controller 115, 123, for example, can reduce the speed of rotation of pickup assembly 111 by outputting an adjustment signal to pickup actuator 111B. Alternatively or in addition thereto, controller 115, 123, for example, can reduce the speed of rotation of the PTO shaft by outputting an adjustment signal to PTO actuator 106B, which can involve changing of gears associated with PTO 106. Alternatively or in addition thereto, controller 115, 123, for example, can change the angular position of density arm 243 by outputting an adjustment signal to density arm actuator 243B, for instance, to lower the density pressure. Further, pickup sensor 111A, ground speed sensor 134A, and density arm position sensor 243A can be used to know the location of the respective structure sensed by these sensors, so that controller 115, 123 can know how much to adjust the respective structure. In sum, operative parameters that can be adjusted include at least one of: a ground speed of the baler frame 130; a speed of the pick-up shaft 248 of pickup assembly 111; a speed of the PTO shaft of PTO 106; the angular position of density arm 243.

Optionally, the bale rotational speed (such as that provided by sensors 244, 245-1A, 245-2A, and/or 246) can be used in coordination wrapping assembly 242. That is, the values associated with bale rotational speed can be coordinated with wrap assembly 242, so as to adjust a wrap tension provided by wrapping assembly 242, based at least in part on the bale rotational speed that has been monitored. This can beneficial in that it can be determined if the relationship with the wrap material (i.e., net, twine, plastic wrap) speed and the bale rotational speed is changing in a way that might indicate that the wrap material is being stretched and thus has an increased risk of tearing or breaking. Thus, wrapping assembly 242 can include a sensor which senses the wrap speed and outputs a wrap seed signal to controller 123, which receives the wrap speed signal and compares the values of the bale rotational speed and the wrap speed by calculating a difference therebetween. When the difference exceeds a predetermined threshold, then a stretched, torn, or broken condition of the wrap material can be determined by controller 114, 123 and outputted to, for example, display 120, so as to inform operator.

In use, agricultural baler system 135, including tractor 100 and baler 101, can include one or more sensors of the first group of sensors 244, 245-1A, 245-2A, 246 and one or more sensors from the second group of sensors 106A, 241-1A. Controller 115, 123 can calculate a difference between a bale rotational speed obtained from a respective sensor from the first group of sensors relative to a reference speed obtained from a respective sensor from the second group of sensors (with any number of combinations of sensors from the two groups) to determine whether bale 110 has stalled or is about to stall in bale chamber 109. If so, then controller 115, 123 can output this information to device 120 so as to inform the operator, so that the operator can take corrective action. Alternatively or in addition thereto, controller 115, 123 can automatically take corrective action, such as by way of outputting adjustment signal(s) to one or more actuators 134B, 111B, 106B, 243B to make adjustments that can prevent the stall from happening or undoing the stall.

Figure 3:
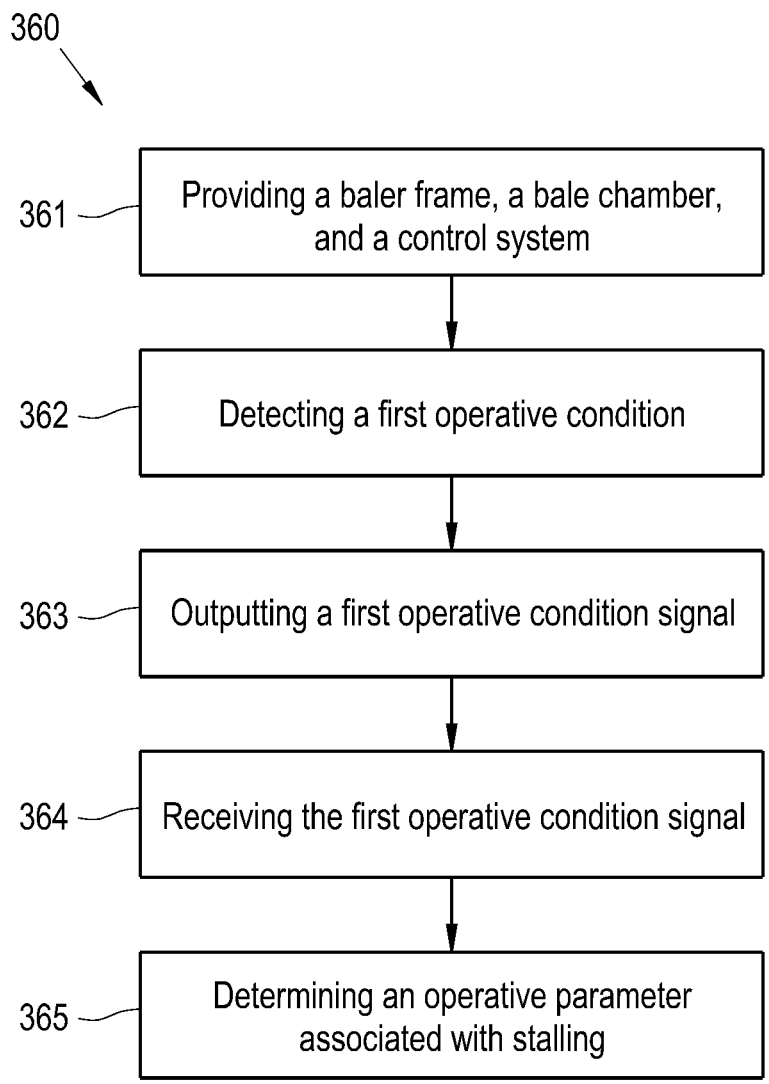
FIG. 3 illustrates a flow diagram showing a method of using the agricultural baler system, in accordance with an exemplary embodiment of the present invention.

Referring now to FIG. 3, there is shown a flow diagram showing a method 360 of using an agricultural baler system 135, the method including the steps of: providing 361 a baler frame 130, a bale chamber 109 at least one of coupled with and formed by the baler frame 130, and a control system 129 operatively coupled with the baler frame 130, the control system 129 including at least one first sensor 244, 245-1A, 245-2A, 246 and a controller system 128 operatively coupled with the at least one first sensor 244, 245-1A, 245-2A, 246; detecting 362, by the at least one first sensor 244, 245-1A, 245-2A, 246, at least one first operative condition associated with a baling operation; outputting 363, by the at least one first sensor 244, 245-1A, 245-2A, 246, at least one first operative condition signal corresponding to the at least one first operative condition; receiving 364, by the controller system 128, the at least one first operative condition signal; and determining 365, by the controller system 128, at least one operative parameter based at least in part on the at least one first operative condition signal, the at least one first operative parameter being associated with a bale 110 of a crop material 136 one of stalling and being about to stall in a bale chamber 109 of a baler 101. Further, control system 129 can further include at least one second sensor 106A, 241-1A configured for: detecting at least one second operative condition associated with the baling operation; outputting at least one second operative condition signal corresponding to the at least one second operative condition; wherein: the controller system 128 is operatively coupled with the at least one second sensor 106A, 241-1A and is configured for: receiving the at least one second operative condition signal; determining the at least one operative parameter based at least in part on the at least one second operative condition signal. Further, the at least one first operative condition can be associated with a rotational speed of the bale 110 in the bale chamber 109 and can be one of: a speed of a belt 240 in the bale chamber 109; a speed of a wheel mechanism 245-1, 245-2 in the bale chamber 109; and a speed of the bale surface of the bale 110. Further, the at least one second operative condition can be one of: a speed of a power take-off shaft; and a speed of a roll 241-1 of the bale chamber 109. Further, the at least one operative parameter can be at least one of: a ground speed of the baler frame 130; a speed of a pick-up 111 of the agricultural baler system 135 which is coupled with the baler frame 130; a speed of a power take-off shaft 106; a position of a device 243 of the agricultural baler system 135 which is coupled with the baler frame 130 and is associated with a density of the bale 110; wherein the controller system 128 is further configured for determining whether one of a stretched condition and a torn condition of a wrap material has occurred.

It is to be understood that the steps of method 360 are performed by controller 115, 123 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123 described herein, such as the method 360, is implemented in software code or instructions which are tangibly stored on a tangible computer readable medium. The controller 115, 123 loads the software code or instructions via a direct interface with the computer readable medium or via a wired and/or wireless network. Upon loading and executing such software code or instructions by controller 115, 123, controller 115, 123 may perform any of the functionality of controller 115, 123 described herein, including any steps of the method 360.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A control system of an agricultural baler system, the agricultural baler system including a baler frame and a bale chamber at least one of coupled with and formed by the baler frame, the control system being operatively coupled with the baler frame, the control system comprising:
   at least one first sensor configured for:
      detecting at least one first operative condition associated with a baling operation;
      outputting at least one first operative condition signal corresponding to the at least one first operative condition;
   a controller system operatively coupled with the at least one first sensor and configured for:
      receiving the at least one first operative condition signal;
      determining at least one operative parameter based at least in part on the at least one first operative condition signal, the at least one first operative parameter being associated with a bale of a crop material one of stalling and being about to stall in the bale chamber of a baler,
   wherein the at least one first operative condition is associated with a rotational speed of the bale in the bale chamber.

2. The control system of claim 1, further including at least one second sensor configured for:
   detecting at least one second operative condition associated with the baling operation;

outputting at least one second operative condition signal corresponding to the at least one second operative condition;

wherein:

the controller system is operatively coupled with the at least one second sensor and is configured for:

receiving the at least one second operative condition signal;

determining the at least one operative parameter based at least in part on the at least one second operative condition signal.

3. The control system of claim 2, wherein the at least one operative parameter is at least one of: a ground speed of the baler frame; a speed of a pick-up of the agricultural baler system which is coupled with the baler frame; a speed of a power take-off shaft; a position of a device of the agricultural baler system which is coupled with the baler frame and is associated with a density of the bale.

4. The control system of claim 1, wherein the at least one first operative condition is one of: a speed of a belt in the bale chamber; a speed of a wheel mechanism in the bale chamber; and a speed of the bale surface of the bale.

5. The control system of claim 2, wherein the at least one second operative condition is one of: a speed of a power take-off shaft; and a speed of a roll of the bale chamber.

6. The control system of claim 1, wherein the controller system is further configured for determining whether one of a stretched condition and a torn condition of a wrap material has occurred.

7. An agricultural baler system, comprising:

a baler frame;

a bale chamber at least one of coupled with and formed by the baler frame;

a control system operatively coupled with the baler frame, the control system including:

at least one first sensor configured for:

detecting at least one first operative condition associated with a baling operation;

outputting at least one first operative condition signal corresponding to the at least one first operative condition;

a controller system operatively coupled with the at least one first sensor and configured for:

receiving the at least one first operative condition signal;

determining at least one operative parameter based at least in part on the at least one first operative condition signal, the at least one first operative parameter being associated with a bale of a crop material one of stalling and being about to stall in the bale chamber of a baler, wherein the at least one first operative condition is associated with a rotational speed of the bale in the bale chamber.

8. The agricultural baler system of claim 7, wherein the control system further includes at least one second sensor configured for:

detecting at least one second operative condition associated with the baling operation;

outputting at least one second operative condition signal corresponding to the at least one second operative condition;

wherein:

the controller system is operatively coupled with the at least one second sensor and is configured for:

receiving the at least one second operative condition signal;

determining the at least one operative parameter based at least in part on the at least one second operative condition signal.

9. The agricultural baler system of claim 8, wherein the at least one operative parameter is at least one of: a ground speed of the baler frame; a speed of a pick-up of the agricultural baler system which is coupled with the baler frame; a speed of a power take-off shaft; a position of a device of the agricultural baler system which is coupled with the baler frame and is associated with a density of the bale.

10. The agricultural baler system of claim 7, wherein the at least one first operative condition is one of: a speed of a belt in the bale chamber; a speed of a wheel mechanism in the bale chamber; and a speed of the bale surface of the bale.

11. The agricultural baler system of claim 8, wherein the at least one second operative condition is one of: a speed of a power take-off shaft; and a speed of a roll of the bale chamber.

12. The agricultural baler system of claim 7, wherein the controller system is further configured for determining whether one of a stretched condition and a torn condition of a wrap material has occurred.

13. A method of using an agricultural baler system, the method comprising the steps of:

providing a baler frame, a bale chamber at least one of coupled with and formed by the baler frame, and a control system operatively coupled with the baler frame, the control system including at least one first sensor and a controller system operatively coupled with the at least one first sensor;

detecting, by the at least one first sensor, at least one first operative condition associated with a baling operation;

outputting, by the at least one first sensor, at least one first operative condition signal corresponding to the at least one first operative condition;

receiving, by the controller system, the at least one first operative condition signal; and determining, by the controller system, at least one operative parameter based at least in part on the at least one first operative condition signal, the at least one first operative parameter being associated with a bale of a crop material one of stalling and being about to stall in the bale chamber of a baler, wherein the at least one first operative condition is associated with a rotational speed of the bale in the bale chamber.

14. The method of claim 13, wherein the control system further includes at least one second sensor configured for:

detecting at least one second operative condition associated with the baling operation;

outputting at least one second operative condition signal corresponding to the at least one second operative condition;

wherein:

the controller system is operatively coupled with the at least one second sensor and is configured for:

receiving the at least one second operative condition signal;

determining the at least one operative parameter based at least in part on the at least one second operative condition signal.

15. The method of claim 14, wherein the at least one operative parameter is at least one of: a ground speed of the baler frame; a speed of a pick-up of the agricultural baler system which is coupled with the baler frame; a speed of a power take-off shaft; a position of a device of the agricultural baler system which is coupled with the baler frame and is associated with a density of the bale.

16. The method of claim 13, wherein the at least one first operative condition is one of: a speed of a belt in the bale chamber; a speed of a wheel mechanism in the bale chamber; and a speed of the bale surface of the bale.

17. The method of claim 14, wherein the at least one second operative condition is one of: a speed of a power take-off shaft; and a speed of a roll of the bale chamber.

18. The method of claim 13, wherein the controller system is further configured for determining whether one of a stretched condition and a torn condition of a wrap material has occurred.

* * * * *